(12) United States Patent
Gunnarsson

(10) Patent No.: US 7,239,657 B1
(45) Date of Patent: Jul. 3, 2007

(54) INTERFERENCE PROTECTION

(75) Inventor: Staffan Gunnarsson, Sollentuna (SE)

(73) Assignee: Tagmaster AG, Kista (SE)

( * ) Notice: Subject to any disclaimer, the term of this patent is extended or adjusted under 35 U.S.C. 154(b) by 791 days.

(21) Appl. No.: 10/129,534

(22) PCT Filed: Nov. 1, 2000

(86) PCT No.: PCT/SE00/02143
§ 371 (c)(1),
(2), (4) Date: Jul. 31, 2002

(87) PCT Pub. No.: WO01/37202
PCT Pub. Date: May 25, 2001

(30) Foreign Application Priority Data
Nov. 8, 1999 (SE) .................................... 9904033

(51) Int. Cl.
*H04B 1/713* (2006.01)
*H04B 1/10* (2006.01)
(52) U.S. Cl. .......................... 375/133; 375/132; 375/254
(58) Field of Classification Search ............... 375/132, 375/135, 136, 140, 141, 146, 147, 227, 228, 375/254, 278, 284, 285, 346, 133; 714/6, 714/7, 48, 49, 52, 54, 710, 758, 774
See application file for complete search history.

(56) References Cited

U.S. PATENT DOCUMENTS

| | | | |
|---|---|---|---|
| 5,341,396 A | 8/1994 | Higgins et al. ................. 375/1 |
| 5,539,775 A | 7/1996 | Tuttle et al. ................. 375/200 |
| 6,501,807 B1 * | 12/2002 | Chieu et al. ................. 375/329 |
| 6,611,198 B1 * | 8/2003 | Geiszler et al. .......... 340/10.41 |
| 6,895,221 B2 * | 5/2005 | Gunnarsson ............... 455/41.2 |
| 6,963,270 B1 * | 11/2005 | Gallagher et al. .......... 340/10.2 |

FOREIGN PATENT DOCUMENTS

| | | |
|---|---|---|
| EP | 0 438 250 B1 | 7/1991 |
| EP | 0 689 161 A2 | 12/1995 |
| EP | 0 935 211 A2 | 8/1999 |
| WO | WO 96/28941 | 9/1996 |
| WO | WO 98/11689 | 3/1998 |

* cited by examiner

*Primary Examiner*—Khanh Tran
*Assistant Examiner*—Sam K. Ahn
(74) *Attorney, Agent, or Firm*—Alfred J. Mangels

(57) ABSTRACT

Apparatus and a method for enhancing the interference resistance of so-called RFID systems, wherein identification messages delivered from an identification device are longer than the time for which an anticipated interference or disturbance is calculated to continue, and wherein the messages contain redundancy, such as a checksum. The messages are delivered from the identification device repetitively, and are redundancy checked. In the event of any discrepancy in the redundancy check, such as when the checksum is checked against the data content of the message and is found in disagreement, successive messages are checked bit for bit against each other. Any deviations between otherwise previously rejected messages are assumed to be due to external interference and are thus successively substituted until the redundancy check gives an accepted result, such as through the medium of a checksum check according to the so-called CRC method.

12 Claims, 3 Drawing Sheets

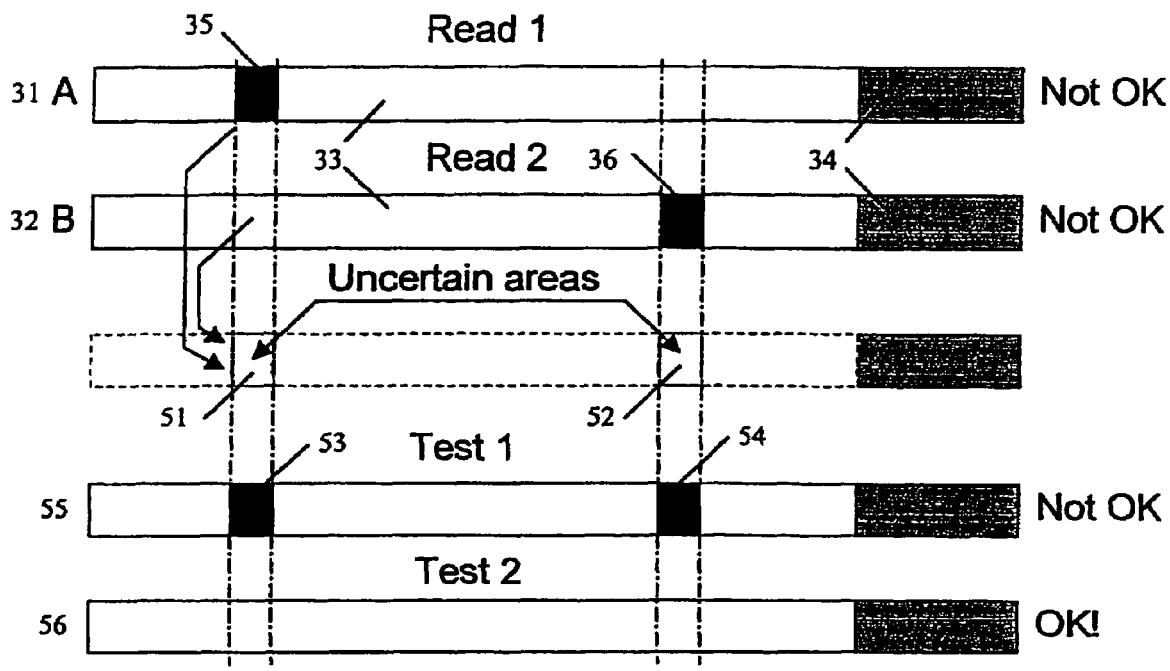
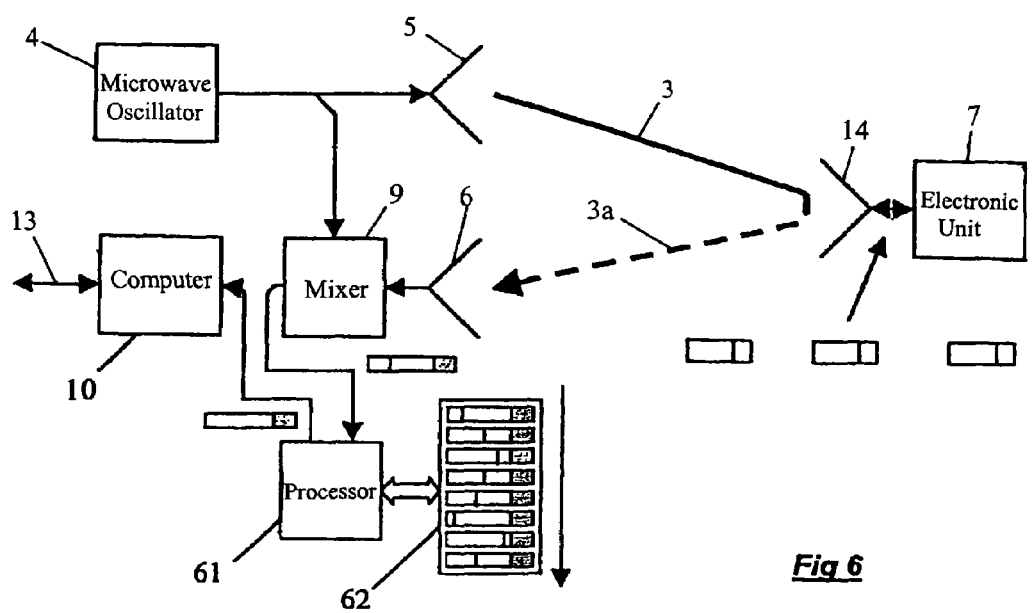

INTERFERENCE PROTECTION

CROSS REFERENCES TO RELATED APPLICATIONS

This application claims the benefit of 371 of PCT/SE00/02143 filed on Nov. 1, 2000 and foreign application 9909 077-9 file in Sweden on Nov. 18, 1999.

BACKGROUND OF THE INVENTION

Automatic identification systems that include identification devices (also called data carriers, escort memories, cards, or ID tags) that deliver information from the identification devices by coding, modulation and reflection of an incident microwave signal in the form of an information containing sideband, without supplying further energy to the identification device, have been known in the art since the middle of the 1970s. Such RFID systems (Radio Frequency Identification systems) are related to "backscatter technology" and are particularly common in the microwave range, e.g. at 915 MHz, 2.45 GHz and 5.8 MHz. 2.45 GHz is also a frequency band that can be used for other radiation sources, such as RFDC links, for instance (Radio Frequency Data Communication links). This means that interference problems originating from RFDC systems can occur.

The present invention provides an RFID system that is robust with respect to interference from, among others, these RFDC systems, but also with respect to interference from other systems which give rise to interferences that are short and unsynchronized in relation to the identification messages.

As distinct from RFID, RFDC operates with microwave transmitters at both ends of the transmission link. RFDC systems often utilize so called spread spectrum technology, where the RFDC messages are transmitted at different microwave frequencies in accordance with a controlled pattern in order to counteract fading effects and interferences/disturbances, from other systems, and where the frequency hops rapidly between different values, so-called frequency hopping.

RFID systems can also operate in accordance with spread spectrum technology, and the invention can thus also be applied to minimize interferences from such systems, and also to suppress interferences from any other system which gives rise to interferences that are shorter than the identification messages of the RFID system.

One problem with present day identification systems is that they are highly sensitive to interferences from sources that deliver signals at the receiver frequency of the RFID systems, for instance in the 2.45 GHz band, which is freely available for many applications. Examples of interference sources include so-called Bluetooth links, systems according to the 802.11 standard, RFID systems that include so called downlinks (i.e. systems that send short microwave pulses to the identification device in order to activate and/or to send data to the identification device), RFID systems that include battery-free identification devices, which are energized from the microwave transmitter of the reader via a microwave signal that is modulated in some way or another, radar stations, microwave ovens, personal detectors in alarm systems, automatic door openers, video transmission links, etc.

SUMMARY OF THE INVENTION

The present invention relates to an identification device and/or identification reader or write/read unit functioning in the microwave range. The invention is adapted to suppress interferences from primarily communications and/or identification systems that operate in accordance with a so-called spread spectrum technique in the form of frequency hopping, or so-called direct sequency. It also is adapted to suppress interferences from any other system that transmits microwave signals at fixed or hopping frequencies, and where the signal has been modulated. A microwave signal delivered from the reader is received by the identification device, modulated with an information sideband on one side or on both sides thereof and the information sideband(s) is/are reflected back to the reader without supplying said signal with further energy. The data content of the identification device includes redundancy, for instance by including a data checksum in the data message of said identification device. The message in the identification device is repeated unchanged at least two times in sequence, and the identification device message has a longer time duration than the anticipated interference, so that only a part of said message can be disturbed. In the event of the checksum/redundancy control indicating that the message has been disturbed when making a comparison between at least two mutually sequential messages, the reader establishes which data bits deviate between the messages, and, after intermediate storage of the messages in the reader, substitutes these deviating bits between the messages by trial and error until the checksum/redundancy control gives an accepted result and therewith registers the message as being a correct message. Alternatively, when all possible combinations have been tried and a correct result has still not been obtained, the test is continued with all possible combinations of the data content of subsequent messages.

The invention is further characterized in that the write/read unit may be of a kind that transmits pulsated microwave signals. The write/read unit in one particular embodiment varies its frequency between different values, so-called spread spectrum technology, by frequency hopping. In a further embodiment said unit carries out the redundancy check by checksum calculation in accordance with the CRC method. Only messages that fail the redundancy test are tested by substitution of disturbed parts in their identification messages.

BRIEF DESCRIPTION OF THE DRAWINGS

The invention will now be described with reference to an exemplifying embodiment thereof, shown in the accompanying drawings, in which:

FIG. 5 illustrates how interfered messages have been reconstructed; and

FIG. 6 illustrates a technical solution for this reconstruction.

DESCRIPTION OF THE PREFERRED EMBODIMENTS

Figure 1:
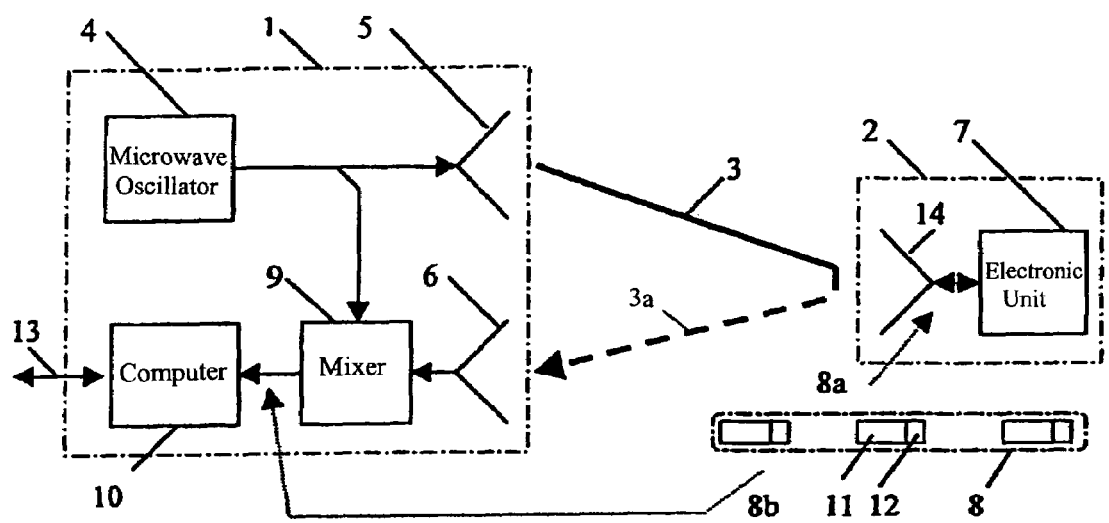
FIG. 1 illustrates an RFID system of the so-called backscatter type.

FIG. 1 shows a read unit 1 and an identification device 2 that are interconnected via a microwave signal 3. The read unit includes a microwave oscillator 4 which irradiates the identification device antenna 14 via the antenna 5. The electronic unit 7 of the identification device 2 receives, encodes, modulates and reflects the signal from the read unit with information according to the data present in the electronic unit of the identification device, and therewith creates so-called identification messages 8 for the read unit.

The data content of these messages may be pre-programmed in the identification device or may be programmable, for instance, via microwaves or via a contact device not shown, or in some other way.

The identification messages 8 are delivered to a receiver antenna 6 in the read unit. The receiver antenna, however, need not necessarily be separate from the transmitter antenna 5, but is so shown in the Figure solely for the sake of simplicity.

The microwave signal received from the identification device by the antenna 6 is transposed to a baseband in a mixer 9 in the read unit 1, by mixing the signal with part of the signal sent by the antenna 5, so as to re-create the identification messages 8 and pass said messages to the computer part 10 of the read unit.

Identification device data and other information can therewith be made available via the communications channel 13, for instance by serial communication in accordance with some typical method.

An important function of the system described hitherto is its redundancy check of the identification messages. For instance, if the identification device is located close to its range limit, its signal to the antenna 6 will only marginally exceed the noise level of the system and certain bits in the message will be erroneous, i.e. the recreated message in 8*b* will not fully coincide with the message delivered by the identification device in 8*a*.

It would be very unfortunate if such errors were reported to superordinate systems. For instance, an automatically identified train travelling at high speed could unintentionally be switched into a railway siding, or an automatically but erroneously identified parking customer could unintentionally cause billing for someone else, etc. This type of error is called a substitution error and is avoided by said redundancy check. In this document, only one redundancy check method, the checksum method, will be mentioned, even though several other methods can be applied to the same end.

Checksum calculations are based on the assumption that the message 8 does not only contain the data 11 to be transmitted, but that corresponding information has also been coded into a checksum 12, and the checksum has been calculated on the basis of said data in accordance with some formula, for instance CRC16 or CRC32, and therewith has been programmed into the identification device in order to include the message.

The computer part 10 of the read unit is now able to differentiate between correct messages and erroneous messages with the aid of said formula, by comparing the content of the data part 11 with the checksum part 12. The messages in which checksum and data do not agree are rejected by the computer part 10, so that these messages cannot be reported further to the superordinate system via the communications channel 13. So-called substitution error has been eliminated in this way, i.e. such errors where erroneous messages are reported as correct messages even though they are in fact erroneous, for instance by having been distorted by noise. This is known technology, described here to clarify the invention.

Figure 2:
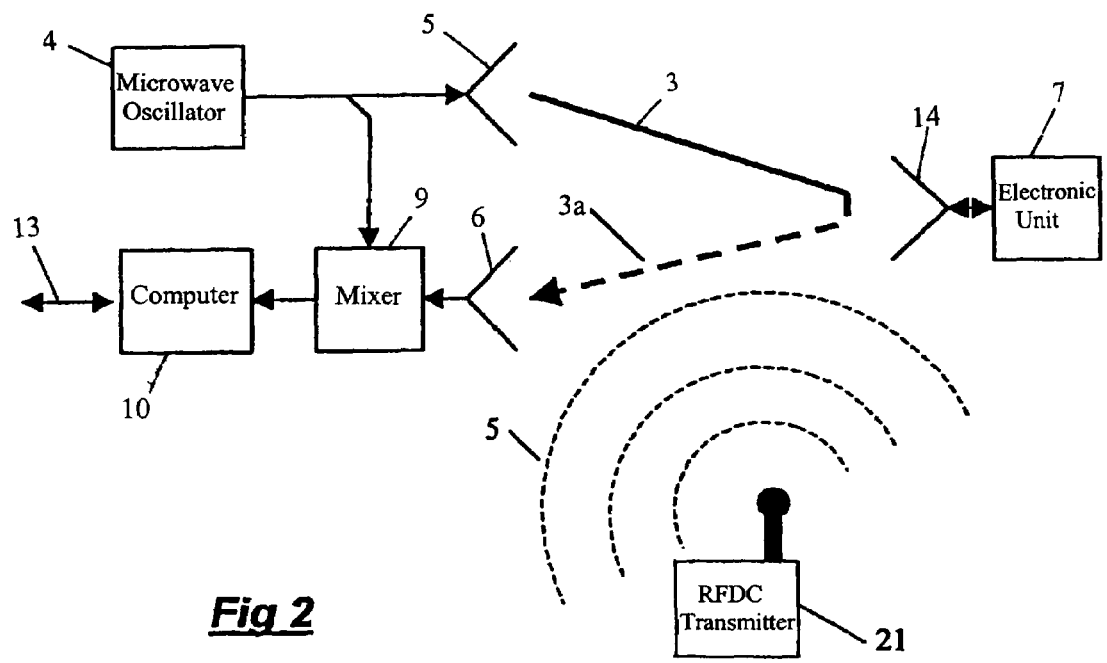
FIG. 2 illustrates an RFID system in an interfering field.

FIG. 2 illustrates an RFID system of the aforedescribed type in the presence of interferences, where reference numeral 21 identifies an RFDC transmitter which communicates with one or more other transmitters (not shown) via microwaves. Reference numeral 21, however, may identify each other type of apparatus that transmits microwaves which may cause disturbances in the communication between identification device 2 and read unit 1—also including other RFID systems.

However, for the sake of clarity it is assumed that the illustrated transmitter 21 is an RFDC transmitter according to the so-called Bluetooth standard at 2.45 GHz, more specifically communicating in the frequency band of 2400–2480 MHz permitted in accordance with CEPT and other authorities, said band also being assumed as standard for data communication in accordance with IEEE 802.11 and also that the RFID system functions at the frequency band of 2446–2454 MHz accepted by CEPT for identification systems, i.e. the so-called A VI band.

The signal 3*a* from the identification device will now have competition from the signal 5 from the RFDC transmitter. If the identification device is located at its range limit, e.g. 10 meters from the read unit, it can be shown theoretically that interference from the signal 5 can be significant even if the RFDC transmitter 21 should be located at a relatively long distance from the read unit, e.g. a distance of 100 meters. The invention is intended to make the RFID system resistant to these interferences.

Figure 3:
FIG. 3 illustrates two consecutive identification messages.

FIG. 3 shows two successive RFID messages 31 and 32 with identical data fields 33 and checksum fields 34. The messages are, however, partially disturbed, more specifically in the intervals 35 and 36. For instance, interval 35 may represent 10 disturbed bits of a total of 100 bits in the data field 33.

Figure 4:
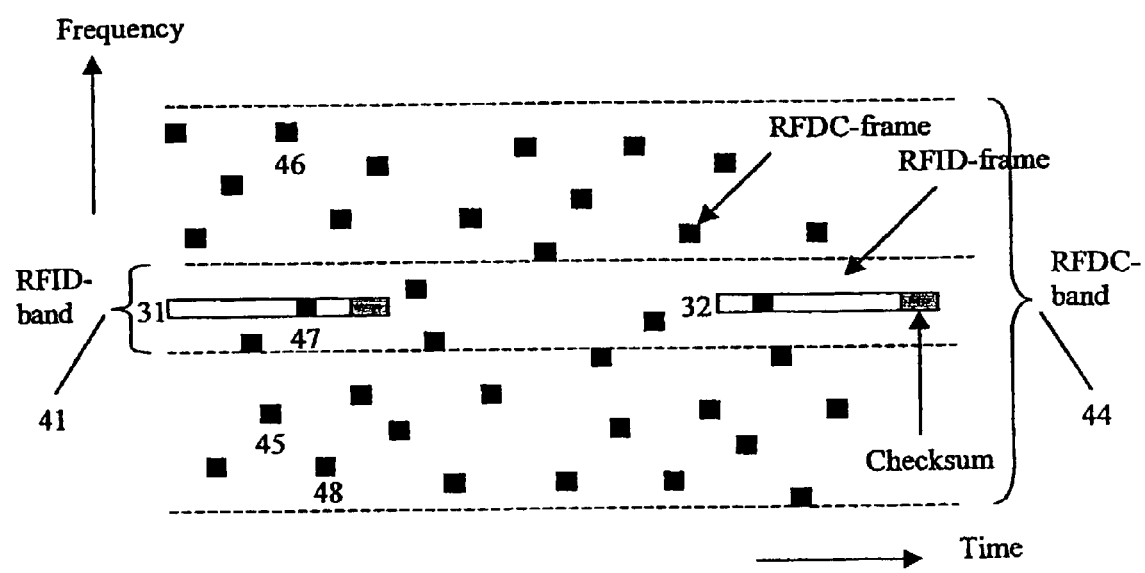
FIG. 4 illustrates interferences from a spread-spectrum RFDC system.

FIG. 4 shows how disturbances, or interferences, according to FIG. 3 can occur.

It is assumed in this embodiment that the RFID system operates in the RFID band 41, a band, which, for instance, may have a width of 8 MHz at 2450 MHz. The identification messages 31 and 32 are transmitted at the frequency in this band to which the read unit is set, or more specifically close to said frequency on either side or on both sides thereof in the form of a sideband or sidebands that contain identification message data. Naturally, the frequency of the RFID transmitter may hop between different frequencies in the RFID band from time to time, so-called spread spectrum technique. However, since this does not affect the principle of the invention, it is assumed for the sake of simplicity that the illustrated RFID system operates at a fixed frequency.

It is also assumed that the receiver of the read unit is optimized to receive the aforesaid information sideband in the best possible way, i.e. the receiver band is only as wide as is required for the messages to be transmitted in an optimal manner. If the bandwidth, for instance, should be 100 kHz, the data transmission rate of the message should be of the same order of magnitude.

It is assumed that the illustrated RFDC transmission of FIG. 4 operates in accordance with the spread spectrum technique with hopping frequency over a band 44 that includes the RFID band, where the frequency, for instance, hops between 80 different channels over a bandwidth of 80 MHz. The RFDC link continues to transmit data at a relatively high data transmission rate, for instance a rate at which each individual channel takes up a frequency space of 1 MHz in width, wherewith the RFDC transmitter transmits constantly but at hopping frequencies according to the pattern 45, 46, 47, 48, and so on.

The interference events that occur, and that the present invention protects against, have been shown in FIG. 4, where the frequency of the RFDC frequency 47 is shown to collide with the RFID message 31.

Without the aid of the present invention, the earlier described redundancy check would have rejected the message 31 as a substitution error, and successive messages would also have been rejected due to non-agreement of their checksum calculations. The RFID link thus becomes totally blocked by the RFDC link.

FIG. 5 illustrates a testing procedure according to the described invention, and FIG. 6 illustrates a device for carrying out the procedure.

The messages 31 and 32 illustrated in FIG. 3 and originally containing identical data 33 and checksum 34, but where a number of bits 35 and 36 have been disturbed in accordance with FIG. 4, result in rejection of both messages.

A processor 61 that in addition to carrying out standard redundancy checks in accordance with the aforedescribed also checks for deviations between mutually successive messages in order to establish possible differences between the messages. The incoming unaccepted messages are placed in a memory bank 62 for successive processing in the processor 61.

If, for instance, the disturbed messages 31 and 32 are now compared with each other bit for bit, the processor will discover two uncertain areas 51 and 52 in which deviations occur. Nevertheless, the processor draws the conclusion that the two messages are identical, because both checksums 34 are identical. An interference or disturbance event has thus probably occurred.

The processor 61 then tests first the event 55, by replacing the deviating area or region 52 in the message 31 with the alternative bit pattern 36, but when carrying out a redundancy check will interpret the message as being erroneous, because the thus changed message 55 now includes errors both at 53 and 54.

The processor will then test event 56, by replacing the deviating area or region 51 with corresponding data in message 32, and will therewith find that the thus changed message 56 agrees with the redundancy check. The message is therewith accepted. The computer part 10 will thus only receive messages when interferences, or disturbances, from different sources, for instance from Bluetooth-type RFDC systems, are filtered out.

In accordance with the present invention, the processor 61 may be given one of a number of different forms, e.g. the form of a gate matrix, and need not contain software. A hardware solution is to be preferred for dealing with simple interference events, as the solution can be carried out very rapidly.

In order to handle complicated interference events, the processor 61 may consist of a signal processor that has powerful mathematical functions, as this facilitates the use of advanced calculation algorithms for interference suppression. It may for example happen that the message contains disturbances at several positions, where a larger number of messages are interfered with in succession, and where disturbances also in the checksum need to be dealt with, and so on.

The illustrated embodiment thus constitutes only a limited description of how interferences, or disturbances, can be filtered out. Moreover, there has been illustrated with the aid of a simple example a technique which filters out those interferences, or disturbances, that can be expected when an RFID system is operated in a frequency range where several different applications are in good agreement with each other, e.g. in the so-called ISM band (Industrial, Scientific and Medical), 2.45 GHz.

Furthermore, there has been shown in the illustrated example solely an RFID system in which a non-modulated microwave signal is transmitted from the read unit, which may be the case when the identification device contains a constantly oscillating circuit for clocking its internal logic and its modulation circuits connected to the identification device antenna.

In another embodiment, the read unit may also be used to activate the identification device, for instance by transmitting pulsed microwave signals that are detected by circuits in the identification device, and therewith, for instance, starting an oscillator incorporated in the identification device for forward clocking of data to the modulator circuits connected to the identification device antenna.

In yet another embodiment, the read unit may transmit pulsed microwave signals for transferring data to the identification device for storage in a memory incorporated in the identification device and/or for controlling the function of said device. Consequently, the read unit is at times also referred to as a write/read unit.

What is claimed is:

1. An identification system based upon a microwave signal and capable of suppressing interferences from other systems that transmit a microwave signal spread spectrum technology in the form of frequency hopping or direct sequency, said identification system comprising: a reader for transmitting the microwave signal to an identification device, wherein the identification device modulates at least one information sideband of the microwave signal and reflects the microwave signal and the at least one information sideband back to the reader without new energy being supplied to said microwave signal, wherein data content of the microwave signal reflected by the identification device includes redundancy and the identification device repeats said reflected signal unchanged at least two times in sequence and the signal reflected by the identification device have a longer time duration than an anticipated interference, so that only a part of said reflected signal can be disturbed, and a processor for carrying out a redundancy check on the reflected signal and for comparing said reflected signal unchanged at least two times in sequence, wherein when a deviation is detected between said reflected signal unchanged at least two times in sequence the processor establishes which data bits deviate between said reflected signal unchanged at least two times in sequence and substitutes deviating bits between said reflected signal unchanged at least two times in sequence by carrying out tests until the redundancy check provides an accepted result, whereafter the processor registers the microwave signal as a correct signal.

2. An identification system according to claim 1, wherein when all possible combinations of data bits have been tested and a result is still incorrect, the processor continues the tests with said all possible combinations of data bits in successive messages.

3. An identification system according to claim 1, wherein the reader also transmits pulsated microwave signals.

4. An identification system according to claim 1, wherein the reader varies its frequency between different values by the frequency hopping.

5. An identification system according to claim 1, wherein the redundancy check is effected by a checksum calculation in accordance with at least one of CRC16 or CRC32.

6. An identification system according to claim 1, wherein only reflected signals that fail the redundancy check are tested by substitution of disturbed parts in the microwave signal.

7. A method for suppressing an outside system microwave signal that interfere with a microwave signal utilized by an identification system that includes a reader and an identification device, said method comprising the steps of:

a. transmitting the microwave signal from the reader to the identification device;

b. modulating at least one information sideband of the microwave signal in the identification device and reflecting the microwave signal and the at least one information sideband back to the reader without new energy being supplied to said microwave signal, wherein the microwave signal reflected by the identification device includes redundancy;

c. repeating said reflected signal unchanged at least two times in sequence, wherein the microwave signal reflected by the identification device has a longer time duration than an anticipated interference, so that only a part of said reflected signal is subject to disturbance;

d. carrying out a redundancy check on the reflected signal and comparing said reflected signal unchanged at least two times in sequence;

e. detecting a deviation between said reflected signal unchanged at least two times in sequence and establishing which data bits deviate between said reflected signal unchanged at least two times in sequence;

f. substituting deviating bits between said reflected signal unchanged at least two times in sequence by carrying out tests until the redundancy check provides an accepted result; and g. registering the microwave signal as a correct signal.

8. A method according to claim 7, wherein when all possible combinations of data bits have been tested and a result is still incorrect, continuing the tests with said all possible combinations of data bits in successive messages.

9. A method according to claim 7, wherein the reader also transmits pulsated microwave signals.

10. A method according to claim 7, wherein the reader varies its frequency between different values by frequency hopping.

11. A method according to claim 7, wherein the redundancy check is effected by a checksum calculation in accordance with at least one of CRC16 or CRC32.

12. A method according to claim 7, wherein only reflected signals that fail the redundancy check are tested by substitution of disturbed parts in the microwave signal.

* * * * *